W. H. METZGER.
PLIERS.
APPLICATION FILED JAN. 6, 1911.
1,005,268.
Patented Oct. 10, 1911.
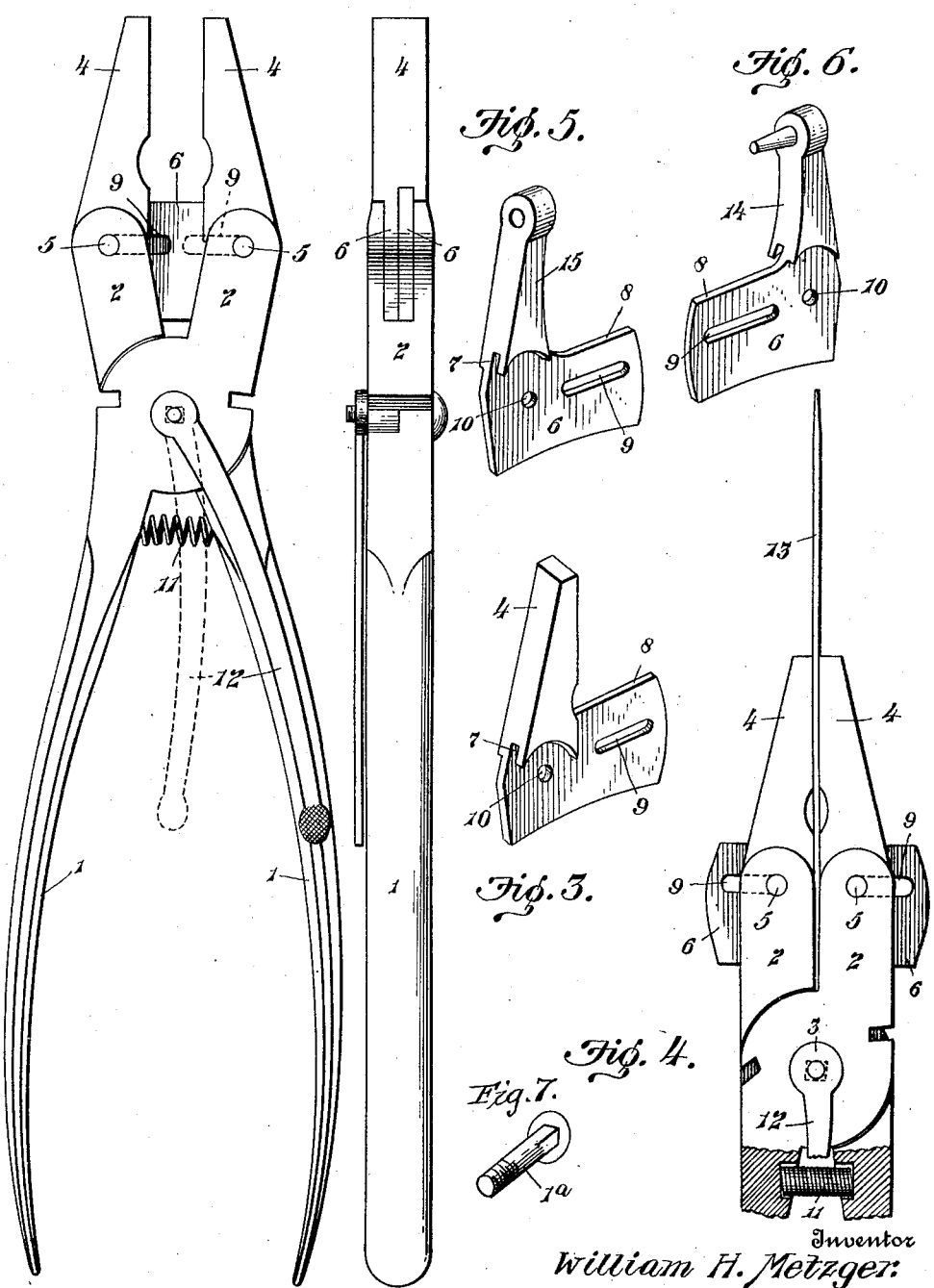
Witnesses
J. H. Bishop.
Sylvia Boron
Inventor
William H. Metzger
By Bond & Miller
Attorneys

UNITED STATES PATENT OFFICE.

WILLIAM H. METZGER, OF CANTON, OHIO, ASSIGNOR OF ONE-HALF TO JACOB E. FRAILEY, OF CANTON, OHIO.

PLIERS.

1,005,268.  Specification of Letters Patent.  Patented Oct. 10, 1911.

Application filed January 6, 1911. Serial No. 601,094.

*To all whom it may concern:*

Be it known that I, WILLIAM H. METZGER, a citizen of the United States, residing at Canton, in the county of Stark and State of Ohio, have invented new and useful Improvements in Pliers, of which the following is a specification.

The present invention relates to that class of pliers in which the grip jaws when opened and closed move in such relationship with reference to each other that the grip or contact faces of the jaws come and go to and from each other in substantially parallel relationship.

The object of the invention is to construct the pliers in a simple manner and to so construct them that the jaws can be held against movement, whereby a tool can be locked and held by the grip jaws.

These objects and others readily apparent to those skilled in the art, I attain by the peculiar construction illustrated in the drawings, in which—

Figure 1 is a side elevation showing the pliers in an open position. Fig. 2 is an edge view. Fig. 3 is a detached perspective view of one of the grip jaws and its shank or guide blade. Fig. 4 is a side elevation showing portions of the handles in section and part of the handles broken away, also showing the jaws closed and locked. Fig. 5 is a detached perspective view of one of the punch jaws, showing the one provided with an aperture. Fig. 6 is a perspective view of one of the punch jaws provided with a punch. Fig. 7 is a detached perspective view of the handle-connecting bolt.

Similar numerals of reference indicate corresponding parts in all the figures of the drawing.

In the accompanying drawing, 1 represents the handles which are constructed in the usual manner and are pivoted together by means of the bolt $1^a$. The handles are provided with the integral jaw connecting bars 2, said handles and jaw-connecting bars being pivotally connected together by the bolt $1^a$. The jaw-connecting bars 2 are bifurcated at their free ends, so as to provide means for connecting the jaws 4. For the purpose of causing the jaws 4 to move with reference to each other in substantially true parallelism, said jaws are provided with the slotted blades or plates 6, said blades or plates being located face to face as shown in Fig. 2. It will be understood that owing to the fact that the handles and jaw-attaching bars are pivotally connected together, said connecting bars and handles cannot move in true parallel relationship with reference to each other, provision must be made for the parallel movement of the jaws 4, and in order to provide for this parallel movement of the jaws they are pivotally connected to the bars 2, by means of suitable rivets 5 or their equivalents.

For the purpose of assisting in holding the blades or plates 6 in close relationship with reference to each other and at the same time assisting in guiding the movements of said plates the grip jaws 4 are provided with the recesses 7, in which recesses the edges 8 of the plates 6 are seated. For the purpose of allowing pivotal movement of the handles 1 and also allowing for the proper movements of the various parts to grip and release articles the plates or blades 6 are provided with the slots 9, through which slots the rivets 5 pass, said rivets being held in fixed relationship with reference to the bars 2 by suitable apertures formed in the bars 2 and the apertures 10 formed in the plates 6.

For the purpose of causing the handles to automatically move away from each other after they have been compressed the spring 11 is provided, which spring is located and arranged in the usual manner, which spring within itself forms no specific part of the present invention. The connecting bolt $1^a$ is formed angular for a portion of its length adjacent its head, which angular portion is seated in an angular aperture in one of the handles and is formed angular for the purpose of preventing the rotation of said bolt; the opposite end of said bolt is screw-threaded and is passed through a non-screw-threaded aperture in the other handle. The bolt $1^a$ is formed of sufficient length so that it will extend a short distance beyond the face of the handle through which the screw-threaded end is passed. Upon the screw-threaded portion which extends beyond the face of the handle is located the lock lever 12, which lock lever is provided with a screw-threaded aperture adapted to receive the screw-threaded portion of the bolt $1^a$. The lock lever 12 is formed of sufficient length to give the desired amount of leverage and when said lock lever is located in the position shown in Fig. 1 the handles will be free to move upon the bolt in such a manner that the handles can be brought to or from each other and the jaws also brought to or from each other in the usual manner. It will, however be understood that the bolt 1ᵃ rocks or moves with one of the handles and the other handle rocks upon the bolt. When it is desired to lock the handles and jaws against movement the lock lever 12 is brought into the position just above indicated, the face of the lever adjacent to the face of the handle upon which it is located will be brought in close contact with the face of said handle or in other words the handles will be gripped between the lock lever 9 and the head of the bolt 1ᵃ thereby locking the handles and jaws against pivotal movement. The locking of the handles and jaws against pivotal movement is desirable for the purpose of firmly gripping a tool such as a screw-driver 13 and when this is desired the lock lever 12 is brought into position to lock and hold the jaws 4 in the position illustrated in Fig. 4.

For the purpose of providing means whereby the pliers may be changed so as to produce a punch the provision is made whereby the jaws 4 may be detached and the punch bars 14 and 15 are substituted for the jaws 4, said punch bars 14 and 15 being formed so that they are interchangeable with the bars 4, the plates or blades 6 being the same in construction and formation in both instances. The interchangeability of the parts carried by the jaw-connecting bars 2 may be carried to any desired extent as it will be understood that other devices may be attached, which other devices may be for any purpose as for instance pruning shears, but regardless of the various uses growing out of the detachability of the parts carried by the attaching bars 2 the manner or method of connecting and guiding said parts so carried is the same in all instances; that is to say, they are each and all provided with the slotted plates and the slotted plates connected the same, regardless of the use of the parts carried by the bars 2.

Having fully described my invention what I claim as new and desire to secure by Letters Patent, is—

1. The herein described pliers consisting of the combination of handles pivotally connected together, jaw-connecting bars, and jaws pivoted to the jaw connecting bars and provided with blades and recesses, said recesses adapted to receive and guide the blades, said blades provided with slots adapted to register with each other and the pivot rivets of the jaws extended through said slots, substantially as and for the purpose specified.

2. The herein described pliers consisting of pivoted handles and jaw-connecting bars, said handles and jaw-connecting bars pivoted between their ends, jaws pivotally connected to the bars, blades located at substantially right angles to the jaws, said blades provided with longitudinal slots, the pivot rivets of the jaws located through the elongated slots and the jaws provided with recesses adapted to guide the slotted blades, substantially as and for the purpose specified.

3. The herein described pliers consisting of the combination of handles and jaw-connecting bars, pivotally connected together between their ends, jaws pivotally connected to the jaw connecting bars, said jaws provided with blades located at substantially right angles to the length of the jaws, said blades provided with elongated slots, and rivets adapted to pivotally connect the jaws to the bars, said rivets extended through the elongated slots of the jaw-blades, substantially as and for the purpose specified.

4. The herein described pliers consisting of the combination of handles and jaw-connecting bars, a bolt provided with angular and screw-threaded portions, the angular portion of the bolt located in a correspondingly angular aperture in one of the handles and the screw-threaded portion located in a non-screw-threaded aperture in the other handle, and a lock lever located upon the screw-threaded portion of the bolt, said lock lever adapted to lock the handles against pivotal movement, substantially as and for the purpose specified.

5. The herein described pliers consisting of handles and jaws pivoted between their ends, one end of the pivot extended beyond the face of one of the handles, said extended portion provided with screw threads, and a lock lever provided with a screw-threaded aperture and mounted upon the screw-threaded portion of the bolt, and adapted to lock the handles and jaws against pivotal movement, substantially as and for the purpose specified.

In testimony that I claim the above, I have hereunto subscribed my name in the presence of two witnesses.

WILLIAM H. METZGER.

Witnesses:
  JOHN H. SPOUSELL,
  F. W. BOND.

Copies of this patent may be obtained for five cents each, by addressing the "Commissioner of Patents, Washington, D. C."